(12) United States Patent
Yang et al.

(10) Patent No.: US 12,409,811 B2
(45) Date of Patent: Sep. 9, 2025

(54) METHOD OF PREPARING FOR DISCHARGE OF ELECTRIC LATCH ASSEMBLY

(71) Applicants: Hyundai Motor Company, Seoul (KR); Kia Corporation, Seoul (KR)

(72) Inventors: Hee-Tae Yang, Yongin-si (KR); Chang-Woo Sohn, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 406 days.

(21) Appl. No.: 17/979,160

(22) Filed: Nov. 2, 2022

(65) Prior Publication Data

US 2023/0242074 A1 Aug. 3, 2023

(30) Foreign Application Priority Data

Jan. 28, 2022 (KR) .................. 10-2022-0013168

(51) Int. Cl.
*B60R 25/24* (2013.01)
*E05B 81/04* (2014.01)
*E05B 81/64* (2014.01)
*E05B 81/90* (2014.01)

(52) U.S. Cl.
CPC ............ *B60R 25/243* (2013.01); *E05B 81/04* (2013.01); *E05B 81/64* (2013.01); *E05B 81/90* (2013.01)

(58) Field of Classification Search
CPC ....... B60R 25/243; B60R 16/02; B60R 25/01; B60R 25/20; B60R 25/40; E05B 81/04; E05B 81/64; E05B 81/90; E05B 81/16; E05B 81/06; E05B 81/62; E05B 81/80; G07C 9/00896; G07C 9/00944; G07C 2009/00642; B60J 5/0493
See application file for complete search history.

(56) References Cited

U.S. PATENT DOCUMENTS

| | | | | |
|---|---|---|---|---|
| 5,600,302 | A * | 2/1997 | Lewis | G07C 9/00182 340/542 |
| 5,831,520 | A * | 11/1998 | Stephan | B60R 25/225 340/426.36 |
| 10,131,321 | B1 * | 11/2018 | Ahsan | B60R 25/24 |
| 2008/0048829 | A1 * | 2/2008 | Nakajima | B60R 25/245 340/426.36 |
| 2008/0106375 | A1 * | 5/2008 | Nakajima | B60R 25/245 340/5.72 |
| 2008/0231417 | A1 * | 9/2008 | Kurpinski | G07C 9/00309 340/5.72 |

(Continued)

FOREIGN PATENT DOCUMENTS

KR 20000021649 A 4/2000

*Primary Examiner* — Curtis J King
(74) *Attorney, Agent, or Firm* — Slater Matsil, LLP

(57) ABSTRACT

An embodiment method of preparing for discharge of an electric latch assembly includes determining whether the electric latch assembly is in an unlocked state, in response to a determination that the electric latch assembly is in the unlocked state, monitoring a voltage of a battery, comparing the voltage of the battery with a preset reference voltage at which a mechanical redundancy (MR) mode is to be activated, and activating the MR mode by driving an MR motor installed inside the electric latch assembly in response to the voltage of the battery being less than or equal to the reference voltage.

18 Claims, 2 Drawing Sheets

(56) References Cited

U.S. PATENT DOCUMENTS

| | | | | |
|---|---|---|---|---|
| 2010/0050713 A1* | 3/2010 | Nagao | ............... | G07C 9/00309 |
| | | | | 70/255 |
| 2012/0280791 A1* | 11/2012 | Kim | ............... | B60R 25/24 |
| | | | | 340/5.72 |
| 2012/0299538 A1* | 11/2012 | Arai | ............... | B60L 53/65 |
| | | | | 320/108 |
| 2016/0073253 A1* | 3/2016 | Grodin | ............... | H04W 48/04 |
| | | | | 455/418 |
| 2017/0160786 A1* | 6/2017 | Ji | ............... | G07C 9/00309 |
| 2018/0300965 A1* | 10/2018 | Mori | ............... | G07C 5/004 |
| 2021/0291785 A1* | 9/2021 | Basu | ............... | B60R 25/2018 |
| 2023/0128709 A1* | 4/2023 | Pohl | ............... | B60R 25/403 |
| | | | | 70/277 |
| 2024/0080765 A1* | 3/2024 | DeLong | ............... | B60R 25/24 |
| 2024/0102324 A1* | 3/2024 | Marega | ............... | E05B 81/06 |
| 2024/0209661 A1* | 6/2024 | Szegeny | ............... | E05B 81/82 |
| 2024/0271471 A1* | 8/2024 | Schmitz | ............... | E05B 81/86 |
| 2025/0003261 A1* | 1/2025 | Inan | ............... | E05B 81/02 |

\* cited by examiner

METHOD OF PREPARING FOR DISCHARGE OF ELECTRIC LATCH ASSEMBLY

CROSS-REFERENCE TO RELATED APPLICATIONS

This application claims the benefit of Korean Patent Application No. 10-2022-0013168, filed on Jan. 28, 2022, which application is hereby incorporated herein by reference.

TECHNICAL FIELD

The present disclosure relates to a method of preparing for discharge of an electric latch assembly.

BACKGROUND

A latch is installed on a door, a trunk lid, etc. of a vehicle in order to prevent an outsider from entering the vehicle and to prevent an opening/closing unit such as a door or a trunk lid from being opened while traveling.

For example, the latch installed on the door of the vehicle performs lock, unlock, open, and close functions, so that the door may not be opened in a locked state, and the door may be opened as the door latch is released from a striker installed on a vehicle body by operating an inside or outside handle of the door after allowing the door to be in an unlocked state. In addition, when the door is being closed, the door is closed as the door latch restrains the striker, and then the door latch is in a locked state.

Recently, due to the luxury of specifications, an electric door latch for allowing the door latch to be locked and unlocked by driving a motor other than a driver's operation is mainly applied to high-end vehicles.

In order to lock or unlock the electric door latch, electric power should be applied to the motor, and the electric power required to operate the motor is supplied from a battery of the vehicle. Accordingly, there is a problem in that when the electric power required to operate the motor is not supplied, the door may not be opened and closed.

The electric latch assembly provides a mechanical redundancy (MR) function to release the electric latch assembly even in a situation where the electric power may not be supplied due to a vehicle collision or discharge of the battery. Normally, the electric latch assembly is locked/unlocked through the motor, but in a state where the electric power may not be supplied, a key is inserted into a keyhole so that the door handle and the latch are mechanically connected, thereby allowing the electric latch assembly to be unlocked. This may be applied when a smart key is located outside the vehicle and electric power may not be supplied due to discharge, etc.

However, when discharge occurs in a state where the smart key is located inside the vehicle, the electric latch assembly may not be operated and thus the door may not be opened.

The contents described in this section are to help the understanding of the background of the present disclosure, and may include what is not previously known to those skilled in the art to which the present disclosure pertains.

SUMMARY

The present disclosure relates to a method of preparing for discharge of an electric latch assembly. Embodiments relate to a method of controlling an electric latch assembly applied to a door of a vehicle to allow the door to be locked or unlocked by driving a motor. Particular embodiments relate to a method of preparing for discharge of an electric latch assembly, which activates the electric latch assembly in a mechanical redundancy (MR) mode so that the door may be opened when a voltage of a battery is lowered and a smart key is located inside a vehicle.

Embodiments of the present disclosure can solve problems in the art, and an embodiment of the present disclosure provides a method of preparing for discharge of an electric latch assembly, which activates an MR mode so that the electric latch assembly may be manually opened just before electric power of a battery is fully discharged in a vehicle to which the electric latch assembly is applied to a door.

A method of preparing for discharge of an electric latch assembly according to embodiments of the present disclosure includes determining an unlock that determines whether the electric latch assembly is in an unlocked state by a control unit, monitoring a voltage that starts monitoring of a voltage of a battery, comparing a voltage that compares the voltage of the battery with a preset reference voltage at which a mechanical redundancy (MR) mode is to be activated, and activating an MR that activates the electric latch assembly in the MR mode by driving an MR motor installed inside the electric latch assembly when the voltage of the battery is the reference voltage or less.

In the activating of the MR, the MR motor is driven to mechanically connect a door handle to a latch so that a door is opened by an operation of the door handle.

When the voltage of the battery is not the reference voltage or less in the comparing of the voltage, the method returns to the monitoring of the voltage.

The method further includes comparing a low-voltage time that determines whether a time for which the voltage of the battery is kept at the reference voltage or less is kept at a preset reference time or more at which the MR mode is to be activated between the comparing of the voltage and the activating of the MR.

When the time for which the voltage of the battery is kept at the reference voltage or less is the reference time or more in the comparing of the low-voltage time, the activating of the MR is performed.

When the time for which the voltage of the battery is kept at the reference voltage or less is not the reference time or more in the comparing of the low-voltage time, the method returns to the monitoring of the voltage.

The method further includes determining a location of a smart key that determines whether the smart key is located inside a vehicle by the control unit between the comparing of the low-voltage time and the activating of the MR.

When it is determined that the smart key is located inside the vehicle in the determining of the location of the smart key, the activating of the MR is performed.

When it is determined that the smart key is not located inside the vehicle in the determining of the location of the smart key, maintaining an MR non-activation in which the electric latch assembly maintains a state where the MR mode has not been activated is performed.

When it is determined that the electric latch assembly is not unlocked when determining the unlock, maintaining an MR non-activation in which the electric latch assembly maintains a state where the MR mode has not been activated is performed.

According to the method of preparing for the discharge of the electric latch assembly according to embodiments of the present disclosure having the above configuration, it is possible to activate the MR mode to open the door before the battery is fully discharged when the voltage of the battery is kept low for a certain time or more and the smart key is detected inside the vehicle.

As described above, it is possible to activate the MR mode in the state where the smart key is located inside the vehicle and the voltage of the battery has the low voltage, thereby preventing the situation where the door may not be opened due to the discharge of the battery.

In addition, when it is determined that the smart key is not located inside the vehicle, the state where the MR mode has not been activated is maintained so that the door may not be opened. It is possible to maintain the state where the MR mode has not been activated even if the voltage of the battery is low when the passenger exits the vehicle with the smart key, thereby increasing security performance.

DETAILED DESCRIPTION OF ILLUSTRATIVE EMBODIMENTS

Hereinafter, a method of preparing for discharge of an electric latch assembly according to embodiments of the present disclosure will be described in detail with reference to the accompanying drawings.

A method of preparing for discharge of an electric latch assembly according to embodiments of the present disclosure includes an unlock determining step (S110) of determining whether an electric latch assembly 11 is in an unlocked state by a control unit 30, a voltage monitoring step (S120) of starting monitoring of a voltage of a battery 20, a voltage comparing step (S130) of comparing the voltage of the battery 20 with a preset reference voltage at which a mechanical redundancy (MR) mode is to be activated, and an MR activating step (S160) of activating the electric latch assembly 11 in the MR mode by driving an MR motor 11c installed inside the electric latch assembly 11 when the voltage of the battery 20 is the reference voltage or less.

Figure 1:
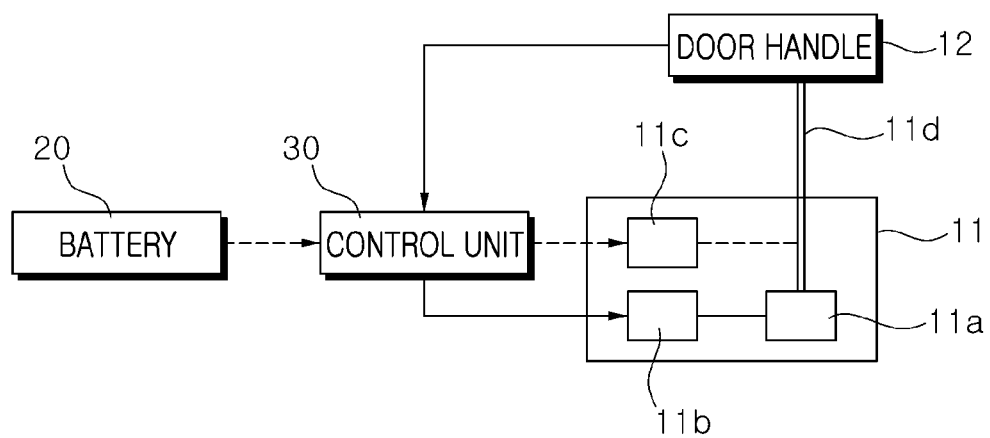
FIG. 1 is a block diagram showing a system in which a method of preparing for discharge of an electric latch assembly according to embodiments of the present disclosure is performed.

FIG. 1 shows a system for performing a method of preparing for discharge of an electric latch assembly according to embodiments of the present disclosure.

An electric latch assembly 11 for restraining a door to a vehicle body of a vehicle is installed in an opening/closing unit of the vehicle, for example, the door.

In the electric latch assembly 11, when a door handle 12 installed on the door is operated, the door may be opened as the electric latch assembly 11 is unlocked. When the door handle 12 is operated by a passenger, an operating signal is transmitted to the control unit 30, and the control unit 30 transmits a control signal to the electric latch assembly 11. When the control signal is transmitted from the control unit 30 to the electric latch assembly 11, a driving motor 11b of the electric latch assembly 11 operates a latch 11a for mechanically locking or unlocking the electric latch assembly 11 with the vehicle body, so that the electric latch assembly 11 is operated.

Meanwhile, the door handle 12 and the electric latch assembly 11 are also mechanically connected. When an emergency key is inserted into a keyhole of an outside door handle and turned after the emergency key is separated from a smart key, the electric latch assembly 11 may be manually unlocked. This is to open the door from the outside during discharging of the battery.

In addition, the electric latch assembly 11 may be in a mechanical redundancy (MR) mode by the control unit 30. As in a case of detecting the collision of the vehicle, when the electric latch assembly 11 may not be normally operated, the control unit 30 operates the MR motor 11c installed inside the electric latch assembly 11 so that a link 11d between the door handle 12 and the latch 11a is connected to activate the mechanical redundancy (MR) mode.

Since the link 11d is not normally connected, the electric latch assembly 11 may not be mechanically operated when the door handle 12 is operated. However, when the electric latch assembly 11 may not be controlled in a normal method as in the case of the collision, the door handle 12 and the latch 11a may be mechanically connected by the link lid when the MR mode is activated, so that the electric latch assembly 11 is unlocked and the door handle 12 may be operated to open the door.

The battery 20 supplies electric power required to operate the electric latch assembly 11. In particular, according to embodiments of the present disclosure, the voltage of the battery 20 is transmitted to the control unit 30 so that the control unit 30 monitors the voltage of the battery 20. A standby current flows in the battery 20 for the purpose of wakeup, etc. through the smart key, telematics, etc., and the battery 20 is discharged by a background current flowing in the vehicle even after ignition-off or key-off. And when the battery 20 is discharged so that the voltage of the battery 20 is lowered to a certain voltage or less, various devices in the vehicle are not operated, and thus the voltage of the battery 20 is monitored.

The method of preparing for the discharge of the electric latch assembly according to embodiments of the present disclosure to be described later is stored in the control unit 30 as a logic and thus performed by the control unit 30, so that the control unit 30 controls the electric latch assembly 11 to prepare for discharge.

Figure 2:
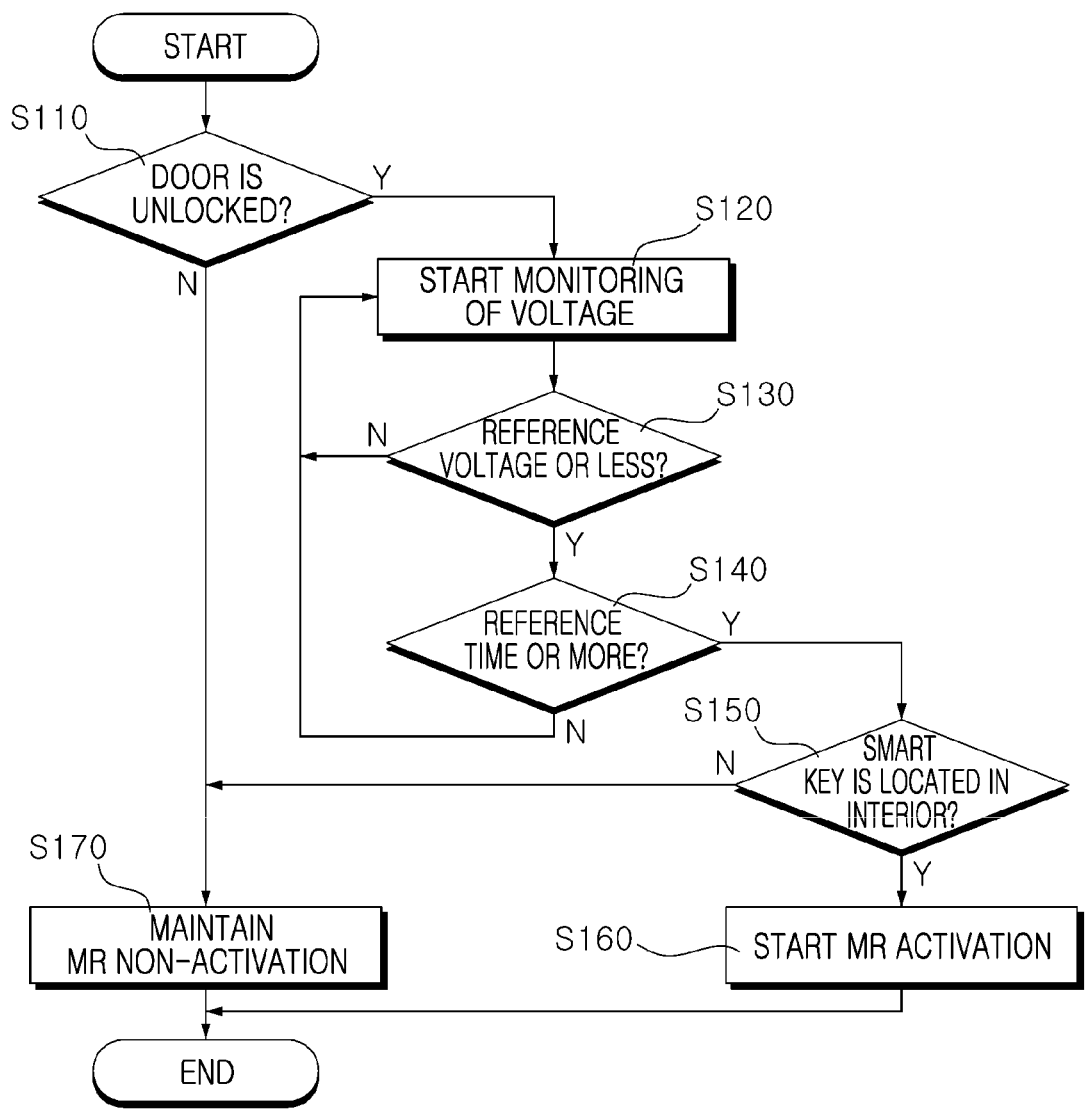
FIG. 2 is a flowchart showing the method of preparing for the discharge of the electric latch assembly according to embodiments of the present disclosure.

FIG. 2 shows the method of preparing for the discharge of the electric latch assembly according to embodiments of the present disclosure.

In the unlock determining step (S110), the control unit 30 determines whether the electric latch assembly 11 is in an unlocked state. Since embodiments of the present disclosure can solve the problem of being not able to open the door in a state where the battery 20 is fully discharged in the state where the smart key is left inside the vehicle in the unlock state, first, it is determined whether the electric latch assembly 11 is in the unlock state by the control unit 30.

In the voltage monitoring step (S120), the control unit 30 starts the monitoring of the voltage of the battery 20. When it is determined that the electric latch assembly 11 is in the unlock state in the unlock determining step (S110), the control unit 30 monitors the voltage of the battery 20 output from the battery 20. Since embodiments of the present disclosure can activate the MR mode of the electric latch assembly 11 before the battery 20 is lowered to the level at which the electric latch assembly 11 may not be operated in a situation where the battery 20 is being gradually discharged, the control unit 30 monitors the voltage of the battery 20 when the electric latch assembly 11 is unlocked.

The voltage comparing step (S130) compares whether the voltage of the battery 20 is a preset reference voltage or less at which the mechanical redundancy (MR) mode is to be activated. In the voltage comparing step (S130), the control unit 30 compares whether the voltage of the battery 20 is the preset reference voltage or less.

Since embodiments of the present disclosure can activate the MR mode so that the electric latch assembly 11 may be mechanically operated in advance in the situation where the battery 20 of the vehicle is being gradually discharged, the control unit 30 monitors the voltage of the battery 20 to compare whether the voltage of the battery 20 is the preset reference voltage or less, and activates the MR mode according to the result.

When a voltage of an electric system in the vehicle is 12 V, the reference voltage may be set to 10 V. In this case, since a lower limit voltage for searching for the smart key is about 9 V, the reference voltage may be set to 10 V in consideration of a margin.

When the voltage of the battery 20 is the reference voltage or less, the low-voltage time comparing step (S140) compares a maintaining time for which the voltage of the battery 20 is kept at the reference voltage or less with a preset reference time to activate the MR mode.

When the time for which the voltage of the battery 20 is kept at the reference voltage or less is the reference time or more, electric power does not sufficiently remain in the battery 20, so that the electric latch assembly 11 should be operated in the MR mode.

Meanwhile, the reason of comparing whether the time for which the voltage of the battery 20 is kept at the reference voltage or less is the reference time or more through the low-voltage time comparing step (S140) is to ignore the instantaneous voltage drop of the battery 20. For example, since the voltage drop instantaneously occurs at the moment when the vehicle is started, an error occurs when only the voltages are simply compared, so that whether the low-voltage state of the battery 20 is kept for the reference time or more is compared.

In addition, when the time for which the voltage of the battery 20 is kept at the reference voltage or less is the reference time or more, it means that the battery 20 is being gradually discharged.

The control unit 30 determines whether to activate the MR mode of the electric latch assembly 11 through the voltage comparing step (S130) and the low-voltage time comparing step (S140).

The control unit 30 continuously monitors the voltage of the battery 20 even while the voltage comparing step (S130) and the low-voltage time comparing step (S140) are performed.

In the voltage comparing step (S130), when the voltage of the battery 20 is not the reference voltage or less, the method returns to the voltage monitoring step (S120).

In addition, even when the time for which the voltage of the battery 20 is kept at the reference voltage or less is not the reference time or more in the low-voltage time comparing step (S140), the method returns to the voltage monitoring step (S120).

A smart key location determining step (S150) determines whether the smart key is located inside the vehicle.

When the control unit 30 confirms the low voltage of the battery 20 through the voltage comparing step (S130) and the low-voltage time comparing step (S140), the control unit 30 determines whether the smart key is located in the vehicle.

In the smart key location determining step (S150), the smart key is searched by the control unit 30, and when it is determined that the smart key is located inside the vehicle, the MR activating step (S160) to be described later is performed.

When the smart key is not inside the vehicle, a driver has the smart key, so that the door may be opened by unlocking the electric latch assembly 11 using an emergency key of the smart key from the outside. Accordingly, since the MR mode is not activated when it is determined that the smart key is not located inside the vehicle, the door is not arbitrarily opened even when the battery 20 is fully discharged, thereby improving security performance compared to the mechanical latch.

In the MR activating step (S160), the control unit 30 activates the MR mode of the electric latch assembly 11.

When it is determined that the battery 20 has the low voltage, the maintaining time is the reference time or more, and the smart key is located inside the vehicle, the control unit 30 operates the MR motor 11c installed on the electric latch assembly 11 to activate the MR mode of the electric latch assembly 11. Here, the activation of the MR mode means that the MR motor 11c is driven to connect the link 11d between the door handle 12 inside the electric latch assembly 11 and the latch 11a of the electric latch assembly 11 from the state of being separated therefrom. When the MR mode is activated, the electric latch assembly 11 is in the unlocked state, so that the passenger operates the door handle 12 to open the door.

Meanwhile, when it is determined that the electric latch assembly 11 is not in the unlocked state in the unlock determining step (S110), the control unit 30 performs an MR non-activation maintaining step (S170) that maintains a state where the MR mode has not been activated.

The state where the electric latch assembly 11 is not in the unlocked state, that is, the locked state is a state whether the driver has locked the electric latch assembly 11 from the outside. As described above, when the electric latch assembly 11 is required to be maintained in a normal state, the MR mode should not be performed, so that the MR non-activation maintaining step (S170) is performed.

The MR non-activation maintaining step (S170) is performed even when it is detected that the smart key is located inside the vehicle in the smart key location determining step (S150).

The MR non-activation maintaining step (170) does not monitor the voltage of the battery 20 in order to prevent the unnecessary consumption of the background current.

What is claimed is:

1. A method of preparing for discharge of an electric latch assembly, the method comprising:
    determining whether the electric latch assembly is in an unlocked state;
    in response to a determination that the electric latch assembly is in the unlocked state, monitoring a voltage of a battery;
    comparing the voltage of the battery with a preset reference voltage at which a mechanical redundancy (MR) mode is to be activated;
    determining a location of a smart key as being located inside or outside a vehicle; and
    activating the MR mode by driving an MR motor installed inside the electric latch assembly in response to the voltage of the battery being less than or equal to the reference voltage.

2. The method of claim 1, wherein activating the MR mode comprises driving the MR motor to mechanically connect a door handle to a latch so that a door is openable by an operation of the door handle.

3. The method of claim 1, wherein in response to the voltage of the battery being greater than the reference voltage, the method comprises continuing monitoring the voltage.

4. The method of claim 1, further comprising, after comparing the voltage and before activating the MR mode, comparing a low-voltage time to determine whether the voltage of the battery is kept at the reference voltage or less for a preset reference time or longer.

5. The method of claim 4, wherein, in response to a determination that the voltage of the battery is kept at the reference voltage or less for the reference time or longer, activating the MR mode is performed.

6. The method of claim 4, further comprising, in response to a determination that the voltage of the battery is not kept at the reference voltage or less for the reference time or longer, not activating the MR mode and continuing monitoring the voltage.

7. The method of claim 1, further comprising, in response to a determination that the location of the smart key is inside the vehicle, activating the MR mode is performed.

8. The method of claim 1, further comprising, in response to a determination that the location of the smart key is outside the vehicle, maintaining an MR non-activation state in which the electric latch assembly maintains a state where the MR mode has not been activated.

9. The method of claim 1, further comprising, in response to a determination that the electric latch assembly is not in the unlocked state, maintaining an MR non-activation state in which the electric latch assembly maintains a state where the MR mode has not been activated.

10. A vehicle comprising:
a vehicle body;
a door coupled to the vehicle body, the door comprising a door handle and an electric latch assembly, the electric latch assembly being in either a locked state or an unlocked state;
a smart key;
a battery disposed in the vehicle body; and
a control unit configured to:
monitor a voltage of the battery when the electric latch assembly is in the unlocked state;
compare the voltage of the battery with a preset reference voltage at which a mechanical redundancy (MR) mode is to be activated;
determine a location of the smart key as being located inside or outside the vehicle before activating the MR mode; and
activate the MR mode by driving an MR motor installed inside the electric latch assembly in response to a determination that the voltage of the battery is less than or equal to the reference voltage.

11. The vehicle of claim 10, wherein the control unit is configured to activate the MR mode by driving the MR motor to mechanically connect the door handle to a latch so that the door is openable by an operation of the door handle.

12. The vehicle of claim 10, wherein the control unit is configured to continue monitoring the voltage in response to a determination that the voltage of the battery is greater than the reference voltage.

13. The vehicle of claim 10, wherein the control unit is configured to compare a low-voltage time to determine whether the voltage of the battery is kept at the reference voltage or less for a preset reference time or longer prior to activating the MR mode.

14. The vehicle of claim 13, wherein the control unit is configured to activate the MR mode in response to a determination that the voltage of the battery is kept at the reference voltage or less for the reference time or longer.

15. The vehicle of claim 13, wherein the control unit is configured to not activate the MR mode and to continue monitoring the voltage in response to a determination that the voltage of the battery is not kept at the reference voltage or less for the reference time or longer.

16. The vehicle of claim 10, wherein the control unit is configured to activate the MR mode in response to a determination that the location of the smart key is inside the vehicle.

17. The vehicle of claim 11, wherein the control unit is configured to maintain an MR non-activation state in which the electric latch assembly is configured to maintain a state where the MR mode has not been activated in response to a determination that the location of the smart key is outside the vehicle.

18. The vehicle of claim 10, wherein the control unit is configured to maintain an MR non-activation state in which the electric latch assembly is configured to maintain a state where the MR mode has not been activated in response to a determination that the electric latch assembly is in the locked state.

* * * * *

UNITED STATES PATENT AND TRADEMARK OFFICE
CERTIFICATE OF CORRECTION

| | | |
|---|---|---|
| PATENT NO. | : 12,409,811 B2 | Page 1 of 1 |
| APPLICATION NO. | : 17/979160 | |
| DATED | : September 9, 2025 | |
| INVENTOR(S) | : Yang et al. | |

It is certified that error appears in the above-identified patent and that said Letters Patent is hereby corrected as shown below:

In the Claims

In Column 8, in Claim 17, Line 33, delete "claim 11," and insert -- claim 10, --.

Signed and Sealed this
Twenty-first Day of October, 2025

John A. Squires
*Director of the United States Patent and Trademark Office*